Oct. 16, 1951 — E. T. HOWES — 2,571,718
LOAD-RESPONSIVE DEVICE
Filed Nov. 20, 1945 — 2 SHEETS—SHEET 1

INVENTOR.
EDGAR T. HOWES
BY Christie & Angus
ATTORNEYS

Oct. 16, 1951  E. T. HOWES  2,571,718
LOAD-RESPONSIVE DEVICE
Filed Nov. 20, 1945  2 SHEETS—SHEET 2
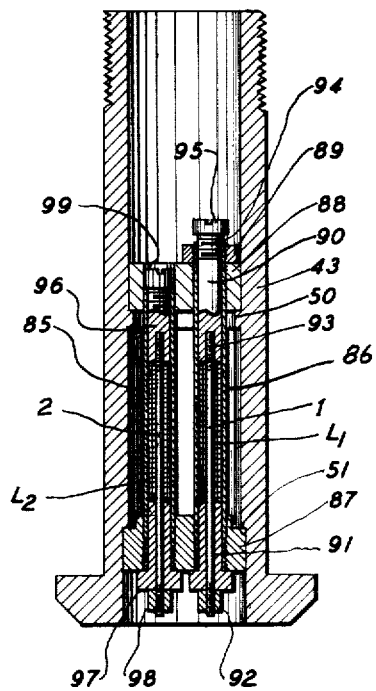
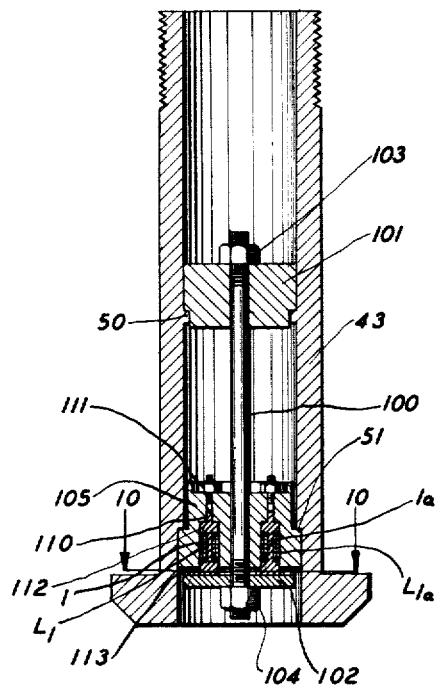
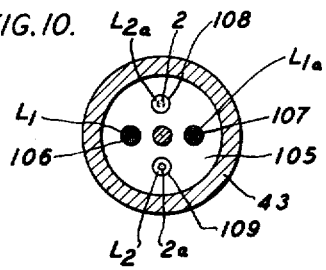
INVENTOR.
EDGAR T. HOWES
BY Christie + Angus
ATTORNEYS Patented Oct. 16, 1951

2,571,718

UNITED STATES PATENT OFFICE 2,571,718

LOAD-RESPONSIVE DEVICE

Edgar T. Howes, Pasadena, Calif.

Application November 20, 1945, Serial No. 629,850

16 Claims. (Cl. 73—141)

This invention relates to the measurement of mechanical forces, such as the tensile forces, which may be exerted on members by loading, and is particularly applicable to weight or load indicators.

The principal object is to provide means by which increments of load produce substantial and easily ascertainable increments on an indicator, and susceptible of large calibration.

My invention is especially suited for measuring heavy loads such as the weight on a hoist for oil-well drill pipe.

This is a continuation-in-part of my copending application Serial No. 551,598, filed August 28, 1944, now abandoned.

In the practice of my invention, I make use of the known phenomenon that a stress applied to a highly permeable metal such as steel, produces a corresponding change in its permeance, which can be detected by a corresponding change of inductance of a coil inductively related to the stressed metal. In other words, a change in stress produces a change in hysteresis losses which produce corresponding changes in the reluctance of an associated magnetic circuit.

A feature of my invention is the arrangement of a pair of permeable members in a mounting, each of the members being provided with a coil, and one of the members being adapted to be stressed while the other remains unstressed.

The invention will be better understood from the following detailed description and the accompanying drawings of which:

Fig. 1 shows the arrangement of a test rod adapted to be subjected to tension and associated in the magnetic circuit of a coil;

Fig. 2 is a diagram showing typical curves of flux density vs. magnetizing force for varying degrees of loading in either tension, compression or torsion on a permeable member of nickel steel; or in compression or torsion on a permeable member of ordinary steel; Fig. 2A shows curves of flux density vs. magnetizing force for varying degrees of tension loading on a permeable member of ordinary steel;

Fig. 8 shows in cross-section another modification;

Fig. 9 shows in cross-section still another modification; and Fig. 10 is a cross-sectional view taken at line 10—10 of Fig. 9.

Figures 1, 3:
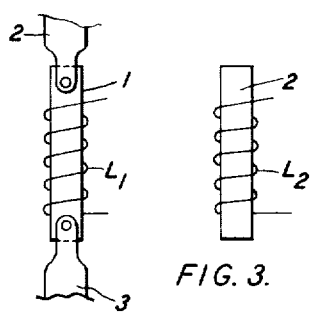
Fig. 3 shows a similar magnetic rod and coil adapted as a reference unit.

In Fig. 1 there is shown a test rod 1 of a permeable material, ordinarily steel, which is adapted to be strained in tension, for example, by being held at its upper end from a support 2, and loaded by the weight of a member 3. The straining of the rod in this manner produces changes in its magnetic permeance, which are used according to this invention for producing indications of the magnitude of the load. For the purpose of utilizing the changes in permeance caused by the load, there is wound around the rod a coil $L_1$ to which is applied an alternating voltage. Changes in the permeance produce corresponding changes in the inductance of the coil.

Figure 2:
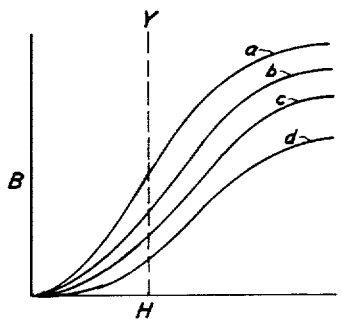

Fig. 2 illustrates curves of flux density (B) vs. magnetizing force or ampere turns (H) for a steel body such as that in Fig. 1, of ordinary steel when subjected to either compression or torsion stress. These curves apply also to a nickel steel subjected to tensile stress as well as when subjected to compression and torsion. When not subjected to any stress, the B—H curve is as indicated by curve $a$. When the load is applied, the permeance becomes decreased producing less flux density for a given magnetizing force, and the B—H curve is according to curve $b$ which is below curve $a$. For further increasing loads, the B—H curve drops further as illustrated by curves $c$ and $d$, curve $d$ being for more load than curve $c$.

Figure 2A:
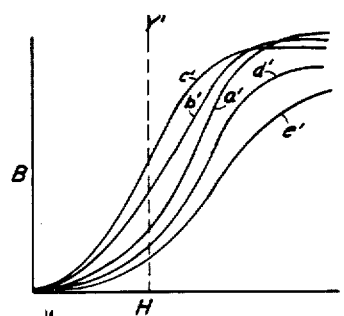

For any ordinary types of steel, other than nickel steel, the relationship between the B—H curves in the case of tension loads is somewhat different from those in Fig. 2. Fig. 2A, for example, shows the B—H curves for a tension load on ordinary steel, curve $a'$ being the curve for no load, curve $b'$ for a light load, and curve $c'$ for a slightly greater load. Then as the load further increases, the curves drop and lie in positions below their zero load curve in much the same relationship as shown by Fig. 2. Thus curve $d'$ is the curve for a load greater than that producing curve $c'$, and curve $e'$ is for a still greater load. With further increased loading the curves continue to fall in this manner.

I make use of the changes in inductance and phase produced in the coil $L_1$ due to the different B—H curves by sending a steady alternating current through the coil and also through another fixed reference impedance, and opposing the voltage across coil $L_1$ against the voltage across the reference impedance. Preferably, the reference impedance is another coil $L_2$ wound around a bar or rod 2, shown in Fig. 3, these being identical with the coil $L_1$ and the rod 1, respectively of Fig. 1. The rod 2 is maintained unloaded so that the electrical properties of coil $L_2$ remain fixed as a reference while rod 1 is being loaded. The advantage of having the coil and core in Fig. 3 identical with that in Fig. 1 is that any slight variations due to atmospheric conditions such as temperature and the like will produce the same effect in both coils; and thereby such factors are eliminated in the balancing of one coil against the other.

In practice it is preferable to proportion the coils $L_1$ and $L_2$ with respect to their cores 1 and 2 so that the greatest possible change in permeance or flux density will be produced from increments in loading of $L_1$. The optimum magnetizing force, or ampere turns in Figs. 2 and 2A are about at the regions $y$ and $y'$ respectively.

Figure 4:
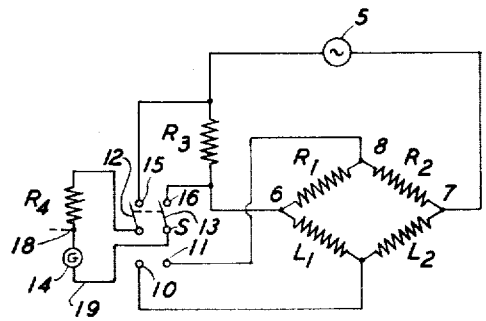
Fig. 4 shows a bridge circuit adapted for indicating force or stress measurements according to my invention.

Fig. 4 shows a bridge type circuit adapted for obtaining indications of the load on bar $L_1$. The bridge comprises the four bridge arms $R_1$, $R_2$, $L_1$ and $L_2$. $L_1$ and $L_1$ are the coils $L_1$ and $L_2$ of Figs. 1 and 3 respectively; and $R_1$ and $R_2$ are fixed impedances, preferably non-inductive resistances. When $L_1$ is made equal to $L_2$ in inductance, which is the relationship I prefer, the impedances $R_1$ and $R_2$ should be equal in order that the bridge shall balance under the condition of no load on the core of $L_1$.

A source of constant amplitude alternating voltage 5, for example a 60-cycle supply line, is connected across the input terminals 6 and 7 of the bridge, preferably through a non-inductive resistor $R_3$ which is provided for a purpose which will be described later. The output terminals 8 and 9 of the bridge are led to the poles 10 and 11 of a double-pole, double-throw switch S, the switch arms 12 and 13 of which are connected across a series arranged resistor $R_4$ and galvanometer 14. The other two terminals 15 and 16 of the switch are connected across resistor $R_3$. By throwing the switch arms 12 and 13 to switch terminals 10 and 11 the resistor $R_4$ and galvanometer 14 are connected across the output of the bridge; and throwing the switch arms the other way connects $R_4$ and galvanometer 14 across resistor $R_3$.

With the switch thrown to connect the galvanometer across the bridge output, there will be no current through the galvanometer in the absence of a load on rod 1, since the bridge is balanced under this condition. When rod 1 is loaded, however, the bridge will become unbalanced due to the change in the inductance of $L_1$ produced by the change in permeance of its core 1; and this unbalance will comprise both an amplitude and a phase unbalance. The degree of the unbalance, and hence the load on the rod, are indicated by the reading on the galvanometer.

Figure 6:
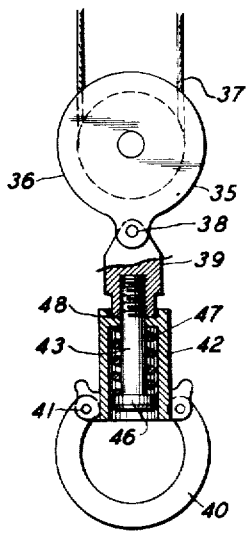
Fig. 6 shows in cross-section an adaptation of the coils of Figs. 1 and 3 in a hoisting unit of a type adapted for hoisting oil-well drill pipe.

Fig. 6 shows a practical application of a weight indicator especially adapted for indicating weights on oil-well drill pipe hoists and the like, which may be used in accordance with my invention. There is shown the usual traveling block assembly 35 comprising pulleys 36 and hoisting cable 37. To the bottom of the block there is attached by a suitable pin 38 a connector piece 39. An ordinary form of bail 40 is provided on which is hung the weight or load to be measured. The bail is fastened by suitable pins 41 to a sleeve 42 which is caused to hang from the connector member 39 by the following apparatus including the coils $L_1$ and $L_2$, about to be described.

Figure 5:
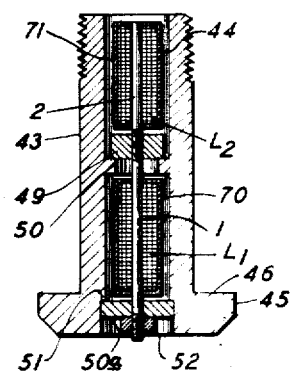
Fig. 5 shows partially in cross-section a detail of the construction shown in Fig. 6.

Referring to Fig. 5, as well as to Fig. 6, a hollow cylinder 43, preferably of steel, is provided with threads 44 at its upper end and is formed into a flange 45 having a broad shoulder 46 at the other end. The threads 44 are adapted to engage corresponding threads within the connector member 39 as shown in Fig. 6. The sleeve 42 carrying the bail 40, is carried from the shoulder 46 by means of a strong spiral compression spring 47, for absorbing shocks, supported on the shoulder. An internal collar 48, attached to or forming part of the sleeve 42, rests on the top of spiral spring 47 so that the weight on the bail is exerted to compress the spring against shoulder 46.

The test rod 1 is placed within the hollow steel cylinder 43 and is threaded at its upper end into a washer 49 which rests on the top of an internal shoulder or collar 50, rigidly attached to or forming part of cylinder 43. The lower end of the rod 1 passes through the washer 50a which is held against a lower shoulder 51 of the member 43 by turning up on a nut 52 on threads at the lower end of rod 1. The coil $L_1$ is placed around the test piece 1 as a core, in the manner shown, and preferably a permeable cylindrical shield 70 closed at the ends and in contact with the core, is placed around the coil; so that the magnetic circuit for the coil is through the core and around through the shield.

The reference rod 2 is threaded at its lower end and held by the threads in the upper portion of washer 49 as shown, the upper end of rod 2 being left free. Coil $L_2$, preferably made identical to $L_1$, is placed around rod 2 in the same way that coil $L_1$ is placed around rod 1, and the magnetic circuit of coil $L_2$ is similar to that of coil $L_1$ in that it passes through rod 2 and shield 71.

In operation, when a load is hung on the bail 40, the cylindrical member 43 is correspondingly strained and this strain is transmitted to rod 1 by the fact that the rod is firmly held between the washers 49 and 50a which firmly abut against the shoulders 50 and 51. The reference rod 2 is not strained, since its upper end is free. Accordingly, when the two coils $L_1$ and $L_2$ are placed in the test circuits of Fig. 4, the indications described in connection with that figure are obtained.

The construction illustrated in Figs. 5 and 6 is suitable for preloading the rod 1, if desired, and this may be done by appropriately turning up a nut 52 to produce the proper degree of strain in rod 1, while there is no load on the bail.

Figure 7:
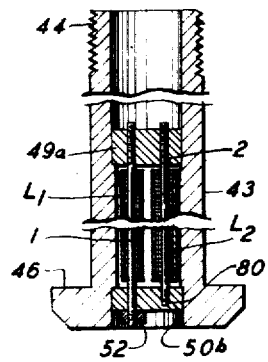
Fig. 7 shows in cross-section a modification, according to my invention, of the arrangement illustrated in Fig. 5.

Fig. 7 shows in cross-section a modified arrangement of a weight indicator coil structure which differs from that shown in Fig. 5 in that the permeable members 1 and 2 are placed side by side in close proximity to each other. The advantage of this arrangement is that extraneous disturbances such as the earth's magnetic field or other magnetic fields in the neighborhood affect both of the coils $L_1$ and $L_2$ to the same extent; and consequently errors due to such extraneous fields are cancelled. The arrangement of Fig. 7 is quite similar to that of Fig. 5, and like parts are given the same numbers. The coils are placed in the same sort of a housing 43. The rod 1, supporting coil $L_1$, is held between washers 49A and 50B in a manner similar to that of Fig. 5 except that the rod, instead of being centrally located, is located to one side to allow room for the second rod 2 and its coil $L_2$. Rod 2 is held at the washer 49A as shown, but is free at its lower end. To allow relative movement between the lower end of rod 2 and the washer or collar 50B, there is provided a cylindrical bore 80 in washer 50B of a diameter sufficient to allow the rod 2 to slide easily in the bore.

Except for the difference in the mechanical arrangement, the function of the device in Fig. 7 is the same as that in Fig. 5.

Fig. 8 illustrates a modification of the construction shown in Fig. 7, in which it is possible to preload the reference coil $L_2$. This preloading may sometimes be desirable for example, when the B—H curves change with loading according to Fig. 2a. Without preloading, the curve in Fig. 2a for the reference coil would be $a'$; and the loaded coil would vary according to the curves $b'$, $c'$, $d'$, $e'$, etc. It might be desirable to have the reference coil lie at the uppermost B—H curve, that is curve $c'$, or one of the curves following $c'$; in this case, the loaded coil is also preloaded to the same point, would then vary according to curves which were always successively lower than the curve for the reference coil. For example, if both coils were preloaded to be characterized by curve $c'$, then all subsequent loading of the loaded coil would vary according to curves $d'$, $e'$, etc.

The arrangement for doing this in Fig. 8 comprises means for pretensioning the rods 2 and 1 within respective hollow cylindrical shields 85 and 86. These hollow shields are preferably of a magnetic material so that they form part of the path of the magnetic circuit for the respective coils. The bottom ends of the shields 85 and 86 are held by being threaded into block 87 which is engaged under shoulder 51. The upper end of shield 86 is fastened at block 88 held by shoulder 50, and a nut 89 is used to hold the cylinder. The rod 1 is held within the cylinder by plug member 90 and extends through plug 91 at the opposite ends of the cylinder. The lower end of rod 1 is held by a nut 92, and the upper end is held by threads 93 in the plug 90, which is threaded to the cylinder at 94. By turning up on nut 92, the rod 1 may be pretensioned at no load; and when load is applied, it will be further tensioned in accordance with the load.

Rod 2 is pretensioned within cylinder 85 in a manner similar to the pretensioning of rod 1, by means of plug members 96 and 97 and nut 98. By suitable tightening up on nuts 92 and 98, the desired degree of pretensioning can be applied to the rods. Although the rod 2 is thus pretensioned, the same as rod 1, the load is not permitted to have any tensioning effect on rod 2, because there is no provision for allowing the load to be communicated to the rod 2 or the cylinder 85. The reason for this is that cylinder 85 is allowed to slide within the bore 99 of member 88.

Figs. 9 and 10 show an arrangement in which loads may be measured by compressing the member 1 instead of tensioning it. The load is applied on member 43 in the same way as in the previously described embodiments. The strain produced by the load is taken in tension by a bolt member 100 connected at one end through a block 101 held against shoulder 50, and at the other end through a disk or platform 102, nuts 103 and 104 being provided so that bolt 100 may be tensioned between the block and the platform.

A block 105 held against shoulder 51 is designed to carry a number of the coils and their core rods. In the embodiment illustrated, four of these coils and core rods are shown. For this purpose, there are provided four holes or bores 106, 107, 108 and 109 through the block. Each core rod is formed so that it will readily take compression, and comprises a bolt member 110 provided with a nut 111 above the block. The lower end of each bolt portion is formed into a head 112 which may be of a circular cross-section. Below head 112 the member forms the rod or core of the coil; and in Fig. 9 there are shown two such core rods 1 and 1a. The lower end of each core rod is formed into a lower head 113 adapted to take the compressive force. The coils $L_1$ and $L_{1a}$ are placed around the respective rods 1 and 1a.

The members 1 and 1a, together with their coils $L_1$ and $L_{1a}$ correspond with member 1 and coil $L_1$ of Fig. 1; and these coils will be connected together in series to constitute the test coil $L_1$. Members 1 and 1a are adapted to be compressed between their heads 112 and 113 whenever load is applied on member 43. The members 1 and 1a are oppositely located, as shown, in order that there may be symmetry of the compressive load against the disk 102. The other two members 2 and 2a taken together correspond with member 2 of Fig. 3; and their lower heads are provided with clearance from the disk 102 as indicated in Fig. 10, so that they will not be compressed by the load. Thus they are adapted to act as reference members as described for member 2.

It will be recognized that any number of these members 1, 1a, 2 and 2a may be used. It is merely desired that symmetry of the compressive load be maintained, since the compressive member must be compressed between disk 102 and the internal shoulder of plug 105.

It will be understood that my invention is not limited to the specific embodiments and arrangements illustrated, but only as set forth in the appended claims.

I claim:

1. A load-responsive device comprising a hollow member a wall of which is subjected to the load, said wall extending in substantially the same direction as the direction of the load, a pair of permeable members fastened within the hollow member, a coil magnetically related to each of said permeable members, one of said permeable members being fastened at its ends to spaced positions of the wall of the hollow member which is subjected to the load, so that it is strained in correspondence with strain of the wall when subjected to the load, the other of said permeable members being fastened so that it is not subjected to strain.

2. A load responsive device comprising a hollow member, a pair of rods of permeable material mounted end-to-end within said hollow member, one of said rods being securely fastened at both ends to portions of said hollow member, the other of said rods being fastened to said hollow member at only one of said ends, and an inductance coil wound around each of said rods.

3. A load-responsive device comprising a hollow member subjected to the load, a pair of permeable members fastened within the hollow member, and placed end to end relatively to each other, a coil magnetically related to each of said permeable members, one of the permeable members being fastened at both ends to a part of the hollow member so that it is strained in correspondence with strain of the hollow member when subjected to the load, the other of said permeable members being fastened at only one end to the hollow member so as not to be subjected to strain.

4. A load-responsive device comprising a hollow member subjected to the load, a pair of permeable members fastened within the hollow member, a coil magnetically related to each of said permeable members, the first of said permeable members being fastened at both ends to parts of the hollow member so that it is strained in correspondence with strain of the hollow member when subjected to load, the second of said permeable members being fastened so that it is not subjected to strain, and means for pretensioning the first permeable member so that it is in tension when there is no load.

5. A load-responsive device comprising a hollow member subjected to load, a pair of permeable members fastened within the hollow member, each of said permeable members having a coil magnetically related to it, said permeable members being located side by side within the hollow member, one of said permeable members being fastened at both its ends to parts of the hollow member so that it is strained in correspondence with strain of the hollow member when subjected to load, the other of said permeable members being fastened so that it is not subjected to strain.

6. A device according to claim 5 in which means is provided for pretensioning the permeable member which is fastened at both ends so that it is subjected to tension even when there is no load.

7. A load-responsive device comprising a hollow member subjected to load, a pair of permeable members fastened within the hollow member, each of said permeable members having a coil magnetically related to it, one of said permeable members being fastened at both its ends to part of the hollow member so as to be subjected to strain in correspondence with strain of the hollow member when subjected to load, the other of said permeable members being fastened at one end to the hollow member and having its other slidably inserted within a bore provided in a portion attached to the hollow member.

8. A load-responsive device comprising a member subjected to load, a pair of permeable members fastened with the first-mentioned member, each of said permeable members having a coil magnetically related to it, said permeable members being located side by side within the first-mentioned member, means for initially tensioning each of said permeable members when there is no load on said first-mentioned member, one of said permeable members being fastened at both its ends to parts of the first-mentioned member so that it is strained in correspondence with strain of the first-mentioned member when subjected to load, the other of said permeable members being fastened so that it is not subjected to strain.

9. A device according to claim 8, in which the means for initially tensioning the permeable members is a hollow shield enclosing each permeable member and means for tensioning each member within its shield.

10. A load-responsive device comprising a member subjected to load and to tensile strain due to the load, a plurality of permeable members fastened within the first-mentioned member, each of said permeable members having a coil magnetically related to it, said permeable members being located side by side, means for compressing a part but not all of the permeable members, said compressing means comprising a platform and a block, the block being held at a first position of the first-mentioned member and means for attaching the platform to a second position of the first-mentioned member which is spaced from said first position, the platform and the second position being located on opposite sides of said first position, and said part of the permeable members extending between the platform and the block whereby said part but not all of the permeable members are subjected to compression in responsse to said load.

11. A load-responsive device comprising a hollow cylinder which is subjected to strain of its cylindrical wall in the direction of its longitudinal axis, a pair of permeable rods fastened within the cylinder, a coil wound around each of the rods, the longitudinal axis of the rods being parallel to each other and to the longitudinal axis of the cylinder, one of the rods being attached at only one position thereof to the cylinder, the other of the rods being fastened at spaced points thereof to respective members which are attached to the cylinder at longitudinally spaced positions along the cylinder so that the last-mentioned rod is strained in correspondence with strain of the cylinder wall between said positions, whereby the last-mentioned rod undergoes a change of permeability due to the strain, in relation to the other rod.

12. A load-responsive device comprising a hollow cylinder which is subjected to strain of its cylindrical wall in the direction of its longitudinal axis, a pair of permeable rods fastened within the cylinder, a coil wound around each of the rods, the longitudinal axes of the rods being parallel to each other and to the longitudinal axis of the cylinder, one of the rods being fastened at each end to respective members which are attached to the cylinder at longitudinally spaced positions along the cylinder so that the last-mentioned rod is strained in correspondence with strain of the cylinder wall between said positions, the other of the rods being fastened at one end, but not at the other end, to the cylinder so that it is not subjected to the strain of the cylinder wall.

13. A load-responsive device comprising a hollow cylinder which is subjected to strain of its cylindrical wall in the direction of its longitudinal axis, a pair of permeable rods fastened within the cylinder, a coil wound around each of the rods, the longitudinal axes of the rods being parallel to each other and to the longitudinal axis of the cylinder, a pair of shoulders attached at spaced positions within the cylindrical wall, a disc held against each shoulder, one of the rods being fastened at its ends to the respective discs so that the last-mentioned rod is strained in correspondence with strain of the cylinder between the shoulders, the other of the rods being fastened at one position to the cylinder so that it is not subjected to the strain of the cylindrical wall.

14. A load-responsive device comprising a cylinder which is subjected to strain of its cylindrical wall in the direction of its longitudinal axis, a pair of permeable rods fastened to the cylinder, a coil wound around each of the rods, the longitudinal axes of the rods being parallel to each other and to the longitudinal axis of the cylinder, one of the rods being attached to the cylinder at two longitudinally spaced positions along the cylinder so that the last-mentioned rod is strained in correspondence with strain of the cylinder wall between said positions, the other of the rods being fastened to the cylinder at one position so that it is not subjected to the strain of the cylinder wall.

15. A load-responsive device comprising a hollow member which is subjected to strain in the direction of one of its axes, a pair of permeable rods fastened to the member, a coil wound around each of the rods, the longitudinal axes of the rods being parallel to each other and to said axis of strain, one of the rods being fastened at separated points to spaced positions of the hollow member so that it is strained in correspondence with strain of said hollow member between said positions, the other of the rods being fastened so that it is not subjected to the strain of the hollow member.

16. A device according to claim 15, in which the hollow member is a cylinder.

EDGAR T. HOWES.

REFERENCES CITED

The following references are of record in the file of this patent:

UNITED STATES PATENTS

| Number | Name | Date |
| --- | --- | --- |
| 1,906,551 | De Forest | May 2, 1933 |
| 2,053,560 | Janovsky | Sept. 8, 1936 |
| 2,269,584 | Eldredge | Jan. 13, 1942 |
| 2,312,888 | Everest | Mar. 2, 1943 |
| 2,327,935 | Simmons | Aug. 24, 1943 |
| 2,360,886 | Osterberg | Oct. 24, 1944 |
| 2,461,635 | Feller | Feb. 15, 1949 |

FOREIGN PATENTS

| Number | Country | Date |
| --- | --- | --- |
| 442,441 | Great Britain | Feb. 3, 1936 |
| 658,570 | Germany | Apr. 6, 1938 |

Certificate of Correction

Patent No. 2,571,718                                                  October 16, 1951

EDGAR T. HOWES

It is hereby certified that error appears in the printed specification of the above numbered patent requiring correction as follows:

Column 3, line 28, for "$L_1$ and $L_1$" read $L_1$ *and* $L_2$; column 5, line 25, for "coil is" read *coil if*; column 8, line 15, for "responsse" read *response*; and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*